United States Patent
Marquez

(10) Patent No.: US 12,098,680 B2
(45) Date of Patent: Sep. 24, 2024

(54) SPARK PLUG ASSEMBLIES FOR TURBOMACHINES

(71) Applicant: General Electric Company, Schenectady, NY (US)

(72) Inventor: Elias Marquez, Queretaro (MX)

(73) Assignee: GE Infrastructure Technology LLC, Greenville, SC (US)

( * ) Notice: Subject to any disclaimer, the term of this patent is extended or adjusted under 35 U.S.C. 154(b) by 873 days.

(21) Appl. No.: 16/693,430

(22) Filed: Nov. 25, 2019

(65) Prior Publication Data
US 2021/0159674 A1    May 27, 2021

(51) Int. Cl.
*F02C 7/266*    (2006.01)
*H01T 13/08*    (2006.01)
*H01T 13/16*    (2006.01)

(52) U.S. Cl.
CPC ............. *F02C 7/266* (2013.01); *H01T 13/08* (2013.01); *F05D 2220/32* (2013.01); *H01T 13/16* (2013.01)

(58) Field of Classification Search
CPC .......... F02C 7/266; F02C 7/264; H01T 13/08; H01T 13/12; H01T 13/16; H01T 13/18; H01T 13/56; F02P 15/003; F02P 13/00
See application file for complete search history.

(56) References Cited

U.S. PATENT DOCUMENTS

| | | | |
|---|---|---|---|
| 2,604,510 A * | 7/1952 | Berkey | F02C 7/266 123/169 CA |
| 6,363,898 B1 * | 4/2002 | Ripma | H01T 13/08 123/145 A |
| 6,519,982 B1 | 2/2003 | Brammall et al. | |
| 9,140,193 B2 * | 9/2015 | Sutcu | F02C 7/266 |
| 9,982,603 B2 * | 5/2018 | Pireyre | F23R 3/10 |
| 2015/0040575 A1 * | 2/2015 | Martinez Fabre | F02C 7/266 60/776 |
| 2016/0003150 A1 * | 1/2016 | DiCintio | H01T 21/02 60/39.827 |
| 2016/0166070 A1 | 6/2016 | Golic et al. | |
| 2023/0366548 A1 * | 11/2023 | Sampath | F23R 3/005 |

FOREIGN PATENT DOCUMENTS

| | | | | |
|---|---|---|---|---|
| GB | 121835 A * | 1/1918 | ............ | H01T 13/16 |
| WO | WO-0126195 A1 * | 4/2001 | ............ | H01T 13/08 |
| WO | WO2015/006550 A1 | 1/2015 | | |

* cited by examiner

*Primary Examiner* — Stephanie Sebasco Cheng
(74) *Attorney, Agent, or Firm* — Dority & Manning, P.A.

(57) ABSTRACT

Spark plug assemblies and turbomachines are provided. A spark plug assembly includes a monolithic hollow cylinder extending along a longitudinal axis between a first end and a second end, the monolithic hollow cylinder including a sidewall defining an interior, a first end wall, and a second end opening. The first end wall defines a first end opening at the first end. The second end opening is defined at the second end. The spark plug assembly further includes an igniter assembly extending along the longitudinal axis into the interior through the first end opening and from the interior through the second end opening. The spark plug assembly further includes a piston surrounding the igniter, the piston disposed within the interior and extending from the interior along the longitudinal axis through the second end opening.

15 Claims, 3 Drawing Sheets

SPARK PLUG ASSEMBLIES FOR TURBOMACHINES

FIELD

The present disclosure relates generally to improved spark plug assemblies for use in turbomachines.

BACKGROUND

Turbomachines are utilized in a variety of industries and applications for energy transfer purposes. For example, a gas turbine engine generally includes a compressor section, a combustion section, a turbine section, and an exhaust section. The compressor section progressively increases the pressure of a working fluid entering the gas turbine engine and supplies this compressed working fluid to the combustion section. The compressed working fluid and a fuel (e.g., natural gas) mix within the combustion section and burn in a combustion chamber to generate high pressure and high temperature combustion gases. The combustion gases flow from the combustion section into the turbine section where they expand to produce work. For example, expansion of the combustion gases in the turbine section may rotate a rotor shaft connected, e.g., to a generator to produce electricity. The combustion gases then exit the gas turbine via the exhaust section.

Spark plugs are generally utilized in turbomachines, such as in the combustion sections thereof, to ignite the compressed working fluid and fuel and generally cause combustion thereof. However, issues with currently known spark plug designs can result in the spark plugs failing, which in turn can cause turbomachine outages and/or significant turbomachine damage.

For example, in many cases, known spark plugs can be easily damaged during installation, resulting in piston binding and ignition failure. Further, various components, such as tie rods, gaskets, nuts, bolts, and washers, fail or become loose during operation of known spark plugs. Still further, combustion dynamics can cause seal failures and exposure to higher than expected temperatures in known spark plugs.

Accordingly, improved spark plugs for use in turbomachines are desired. In particular, spark plugs that address one or more of the above-stated issues would be advantageous.

BRIEF DESCRIPTION

Aspects and advantages of the spark plug assemblies and turbomachines in accordance with the present disclosure will be set forth in part in the following description, or may be obvious from the description, or may be learned through practice of the technology.

In accordance with one embodiment, a spark plug assembly for use in a turbomachine is provided. The spark plug assembly includes a monolithic hollow cylinder extending along a longitudinal axis between a first end and a second end, the monolithic hollow cylinder including a sidewall defining an interior, a first end wall defining a first end opening at the first end, and a second end opening at the second end. The spark plug assembly further includes an igniter assembly extending along the longitudinal axis into the interior through the first end opening and from the interior through the second end opening. The spark plug assembly further includes a piston surrounding the igniter, the piston disposed within the interior and extending from the interior along the longitudinal axis through the second end opening.

In accordance with another embodiment, a turbomachine is provided. The turbomachine includes a compressor section, a combustor section, a turbine section, and a plurality of spark plug assemblies connected in the combustor section. Each of the plurality of spark plug assemblies includes a monolithic hollow cylinder extending along a longitudinal axis between a first end and a second end, the monolithic hollow cylinder including a sidewall defining an interior, a first end wall defining a first end opening at the first end, and a second end opening at the second end. Each of the plurality of spark plug assemblies further includes an igniter assembly extending along the longitudinal axis into the interior through the first end opening and from the interior through the second end opening. Each of the plurality of spark plug assemblies further includes a piston surrounding the igniter, the piston disposed within the interior and extending from the interior along the longitudinal axis through the second end opening.

These and other features, aspects and advantages of the present spark plug assemblies and turbomachines will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present spark plug assemblies and turbomachines, including the best mode of making and using the present systems and methods, directed to one of ordinary skill in the art, is set forth in the specification, which makes reference to the appended figures, in which.

DETAILED DESCRIPTION

Figure 1:
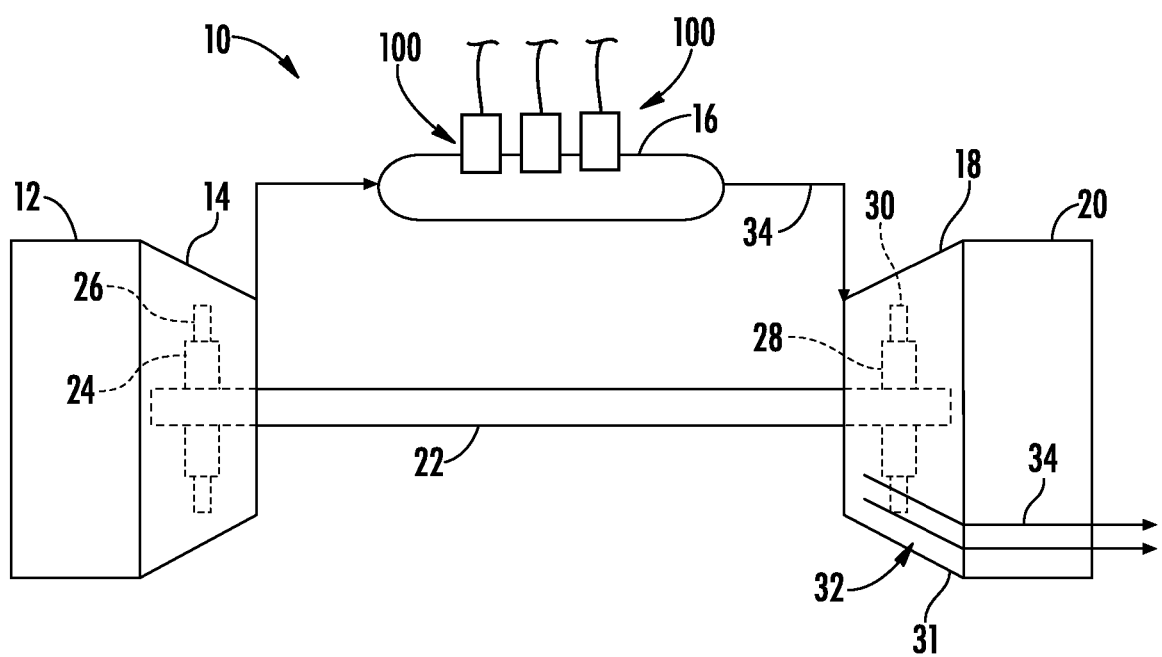
FIG. 1 is a schematic illustration of a turbomachine, in accordance with embodiments of the present disclosure.

Reference now will be made in detail to embodiments of the present spark plug assemblies and turbomachines, one or more examples of which are illustrated in the drawings. Each example is provided by way of explanation, rather than limitation, of the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

Referring now to the drawings, FIG. 1 is a schematic diagram of one embodiment of a turbomachine, which in the illustrated embodiment is a gas turbine 10. Although an industrial or land-based gas turbine is shown and described herein, the present disclosure is not limited to a land-based and/or industrial gas turbine, unless otherwise specified in the claims. For example, the spark plug technology as described herein may be used in any type of turbomachine, including, but not limited to, a steam turbine, an aircraft gas turbine, or a marine gas turbine.

As shown, gas turbine 10 generally includes an inlet section 12, a compressor section 14 disposed downstream of the inlet section 12, a plurality of combustors (not shown) within a combustor section 16 disposed downstream of the compressor section 14, a turbine section 18 disposed downstream of the combustor section 16 and an exhaust section 20 disposed downstream of the turbine section 18. Additionally, the gas turbine 10 may include one or more shafts 22 coupled between the compressor section 14 and the turbine section 18.

The compressor section 14 may generally include a plurality of rotor disks 24 (one of which is shown) and a plurality of rotor blades 26 extending radially outwardly from and connected to each rotor disk 24. Each rotor disk 24 in turn may be coupled to or form a portion of the shaft 22 that extends through the compressor section 14.

The turbine section 18 may generally include a plurality of rotor disks 28 (one of which is shown) and a plurality of rotor blades 30 extending radially outwardly from and being interconnected to each rotor disk 28. Each rotor disk 28 in turn may be coupled to or form a portion of the shaft 22 that extends through the turbine section 18. The turbine section 18 further includes an outer casing 31 that circumferentially surrounds the portion of the shaft 22 and the rotor blades 30, thereby at least partially defining a hot gas path 32 through the turbine section 18.

During operation, a working fluid (such as air) flows through the inlet section 12 and into the compressor section 14 where the air is progressively compressed, thus providing pressurized air to the combustors of the combustor section 16. The pressurized air is mixed with fuel and burned within each combustor to produce combustion gases 34. The combustion gases 34 flow through the hot gas path 32 from the combustor section 16 into the turbine section 18, where energy (kinetic and/or thermal) is transferred from the combustion gases 34 to the rotor blades 30, thereby causing the shaft 22 to rotate. The mechanical rotational energy may then be used to power the compressor section 14 and/or to generate electricity. The combustion gases 34 exiting the turbine section 18 may then be exhausted from the gas turbine 10 via the exhaust section 20.

As shown, one or more spark plug assemblies 100 may be connected in the combustor section 16, such as in one or more combustors thereof. Spark plug assemblies 100 may provide a spark to ignite and cause combustion of the pressurized air and fuel, which is provided to the combustor section 16, creating combustion gases 34.

Referring now to FIGS. 2 through 6, various embodiments of spark plug assemblies 100 in accordance with the present disclosure are provided. Spark plug assemblies 100 in accordance with the present disclosure provide numerous advantages over known spark plugs and in particular over known turbomachine spark plugs. For example, the number of separate components in spark plug assemblies 100 has advantageously been drastically reduced, with components such as tie-rods, gaskets, nuts, bolts, and washers eliminated. Accordingly, in exemplary embodiments, no tie-rods, nuts, bolts, washers, or gaskets are utilized in spark plug assemblies 100 of the present disclosure. Further, the design of spark plug assemblies 100 in accordance with the present disclosure provides a thicker housing and other features that reduce leakage and reduce or eliminate potential points of failure. Accordingly, issues commonly experienced by conventional spark plug assemblies, such as piston binding, ignition failure, components failing or becoming loose, seal failures and/or high temperature exposures, are reduced and/or eliminated.

As shown, spark plug assemblies 100 in accordance with the present disclosure include a monolithic hollow cylinder 110. The use of a monolithic hollow cylinder 110 advantageously eliminates the need for a significant number of components utilized in known spark plugs, such as tie-rods, gaskets, nuts, bolts, and washers, and further eliminates a significant number of spark plug failure points. As shown, the cylinder 110 extends along a longitudinal axis 111 between a first end 112 and a second end 114. Cylinder 110 further includes a sidewall 116 that extends along the longitudinal axis 111 between the first end 112 and the second end 114. The sidewall 116 is generally cylindrical, such that the sidewall 116 and cylinder 110 generally define an interior 118. Cylinder 110 may further include a first end wall 120, which is provided at the first end 112. First end wall 120 may define a first end opening 122. A second end opening 124 may be defined by the cylinder 110 at the second end 114.

The first end opening 122 may have a maximum diameter 123, and the second end opening 124 may have a maximum diameter 125. In exemplary embodiments, the diameter 123 is less than the diameter 125.

In exemplary embodiments, cylinder 110 may further include a fin array 130. Fin array 130 may extend from an exterior surface of the sidewall 116, such as in a radial direction, relative to the longitudinal axis 111, away from the interior 118. Fin array 130 may include a plurality of fins 132, with each fin 132 extending from an exterior surface of the sidewall 116, such as in a radial direction away from the interior 118. In exemplary embodiments, each fin 132 extends in a direction perpendicular to the longitudinal axis 111. Alternatively, fins 132 may extend in a direction parallel to or diagonal to the longitudinal axis 111, as desired to promote suitable heat transfer. Fins 132 are generally heat exchange fins, which facilitate heat transfer and dissipation from the cylinder 110 during operation of the spark plug assembly 100.

Figure 4:
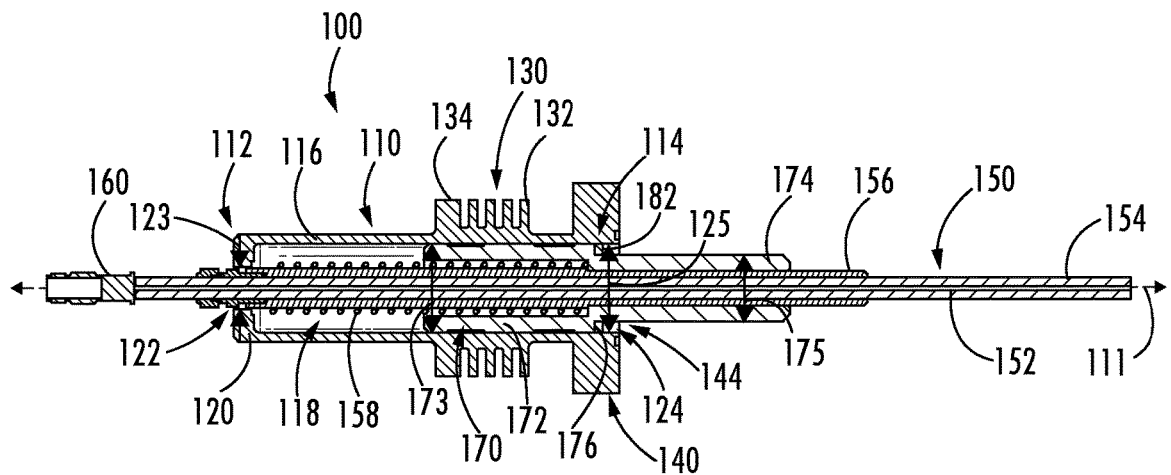
FIG. 4 is a cross-sectional view of a spark plug assembly, in accordance with another embodiment of the present disclosure.
Figure 5:
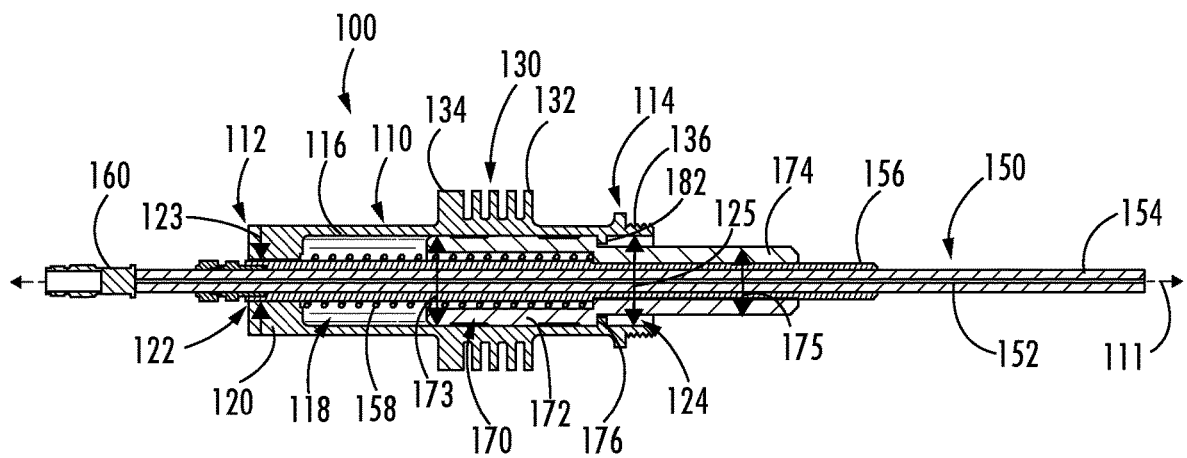
FIG. 5 is a cross-sectional view of a spark plug assembly, in accordance with yet another embodiment of the present disclosure.
Figure 6:
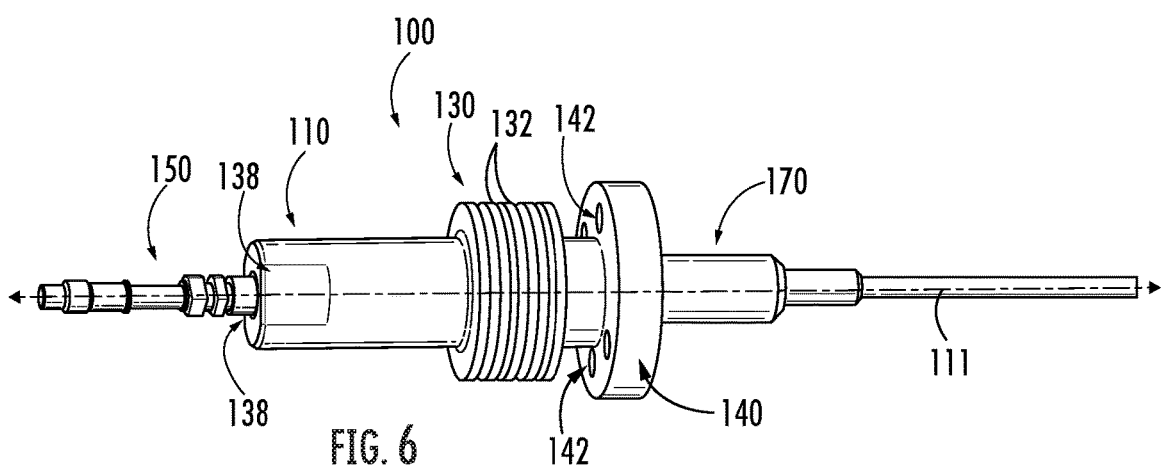
FIG. 6 is a perspective view of a spark plug assembly, in accordance with one embodiment of the present disclosure.

In some embodiments, as illustrated in FIGS. 2 through 5, each of the plurality of fins 132 (and thus the fin array 130) is hexagonal. In alternative embodiments, as illustrated in FIG. 6, each of the plurality of fins 132 (and thus the fin array 130) is circular. In still other alternative embodiments, each of the plurality of fins 132 may be pentagonal, square, or another suitable polygonal shape.

In exemplary embodiments, as illustrated in FIGS. 2 through 5, cylinder 110 may further include a mount protrusion 134. The mount protrusion 134 may extend from the exterior surface of the sidewall 116, such as in a radial direction away from the interior 118. In exemplary embodiments, the mount protrusion 134 extends in a direction perpendicular to the longitudinal axis 111. Mount protrusion 134 is generally a component of the cylinder 110, which facilitates improved installation of the spark plug assembly 100, such as into mount flange 140 and/or turbomachine 10 generally. For example, the mount protrusion 134 may be sized and shaped to prevent the use of impact tools when installing the spark plug assembly 100 and to require the use of an appropriately-sized hand wrench.

In exemplary embodiments as shown, mount protrusion 134 is hexagonal. Alternatively, mount protrusion 134 may be pentagonal, square, or another suitable polygonal shape. A thickness (which may be along the longitudinal axis 111 as shown) of the mount protrusion 134 may be greater than a thickness (which may be along the longitudinal axis 111 as shown) of the fins 132 in embodiments that include both a fin array 130 and a mount protrusion 134.

In exemplary embodiments, as illustrated in FIG. 6, cylinder 110, such as the sidewall 116 thereof, may include discrete flat surface(s) 138. Such surfaces 138 may, for example, be disposed at or near the first end 112. Flat surfaces 138 may facilitate improved installation of the spark plug assembly 100, such as into the turbomachine 10 generally.

As discussed, cylinders 110 in accordance with the present disclosure are monolithic hollow cylinders 110. In exemplary embodiments, each such cylinder 110 is formed from a metal, such as from a stainless steel. The cylinder 110 may, for example, be a machined metal component.

As discussed, the spark plug assembly 100 in accordance with the present disclosure may be connected in a turbomachine 10 and may specifically be connected in a combustor section 16 thereof. In some embodiments, spark plug assembly 100 may include a mounting flange 140. Mounting flange 140 may define a plurality of fastening holes 142 through which suitable mechanical fasteners (for example, bolts) may be extended to connect the mounting flange 140 and spark plug assembly 100 generally to the combustor section 16 (such as to a component of a combustor in the combustor section 16). Mounting flange 140 may further define a central through-hole 144, as shown.

Figure 2:
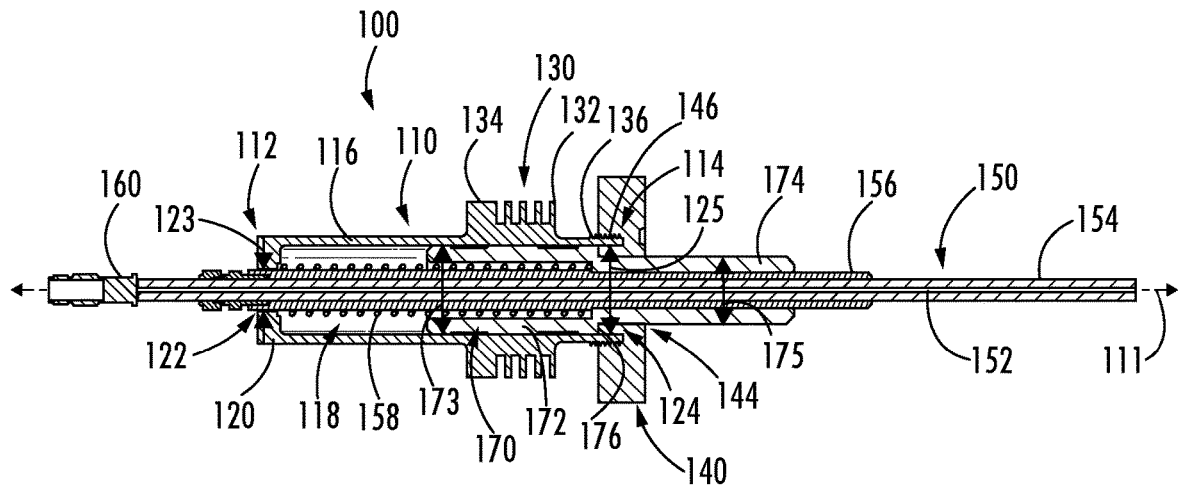
FIG. 2 is a cross-sectional view of a spark plug assembly, in accordance with one embodiment of the present disclosure.
Figure 3:
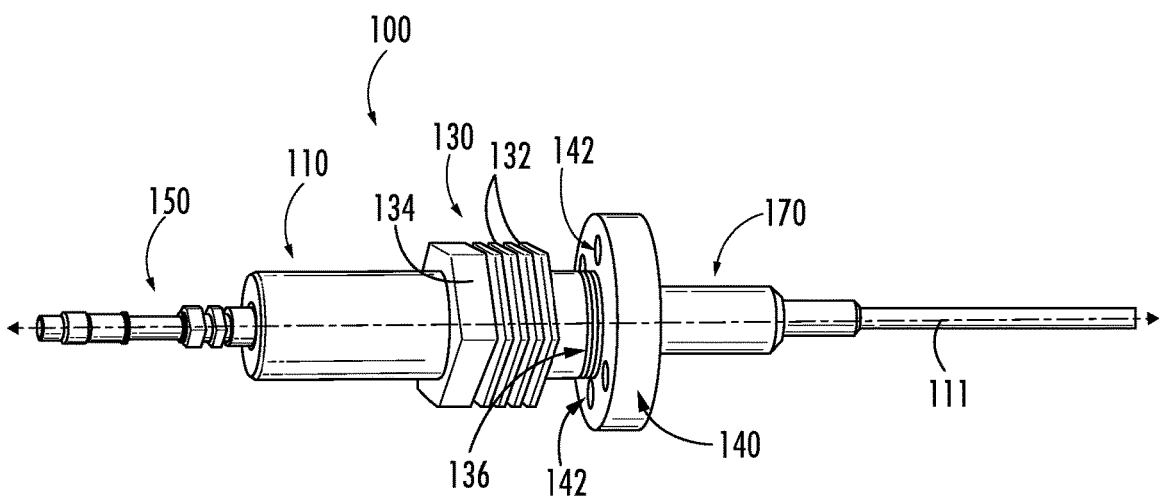
FIG. 3 is a perspective view of the spark plug assembly of FIG. 2.

Mounting flange 140 may be disposed at the second end 114. In some embodiments as shown in FIGS. 4 and 6, the mounting flange 140 is a component of the monolithic hollow cylinder 110. In other embodiments, as shown in FIGS. 2 and 3, the mounting flange 140 may be a separate component that is connected to the monolithic hollow cylinder 110. In exemplary embodiments, the mounting flange 140 may include a thread 146, which is an inner thread 146 that is defined in an inner surface that surrounds and defines the central through-hole 144 of the mounting flange 140 or which, as shown, is spaced radially outwardly from the central through-hole 144. The thread 146 may engage an external thread 136 of the monolithic hollow cylinder 110 to connect the mounting flange 140 with the monolithic hollow cylinder 110. The external thread 136 may be defined along a portion of the exterior surface of the sidewall 116, such as at the second end 114. In exemplary embodiments, threads 136, 146 may be NPT threads.

In other embodiments (such as in FIG. 5), no mounting flange 140 may be utilized, and the monolithic hollow cylinder 110 may be directly connected to the combustor section 16 (such as to a component of a combustor in the combustor section 16). For example, cylinder 110 may include the external thread 136 defined in the sidewall 116, such as at the second end 114, and this external thread 136 may engage with an internal thread provided in the combustor section 16.

Referring again to FIGS. 2 through 6, the spark plug assembly 100 in accordance with the present disclosure may further include an igniter assembly 150. The igniter assembly 150 may extend along the longitudinal axis 111 and may extend into and from the cylinder 110. For example, the igniter assembly 150 may extend into the interior 118 through the first end opening 122, through the interior 118, and from the interior 118 through the second end opening 124.

Igniter assembly 150 may, for example, include a conductor wire 152 and an insulator layer 154 surrounding the conductor wire 152. Insulator layer 154 may be formed from a suitable material such as a ceramic. Igniter assembly 150 may further include a housing 156 surrounding the insulator layer 154. Igniter assembly 150 may further include a spring 158 surrounding a portion of the housing 156 within the cylinder 110. A connector 160 may be provided at an end of the igniter assembly 150, such as the end extending from the first end opening 122. The connector 160 may be formed, for example, from copper or another suitable metal. Connector 160 may connect the igniter assembly to a suitable electrical source.

The spark plug assembly 100 in accordance with the present disclosure may further include a piston 170. The piston 170 may surround the igniter assembly 150 with the igniter assembly 150 extending through the piston 170. The piston may be disposed within the interior 118 and extend from the interior 118 (such as along the longitudinal axis 111) through the second end opening 124.

Piston 170 may include a first portion 172 and a second portion 174. The first portion 172 may have a maximum outer diameter 173, and the second portion 174 may have a maximum outer diameter 175. In exemplary embodiments, the maximum outer diameter 173 may be greater than the maximum outer diameter 175. First portion 172 may be disposed entirely within the interior 118, while second portion 174 extends from the interior 118 (such as along the longitudinal axis 111) through the second end opening 124.

A shoulder 176 may be defined between the first portion 172 and second portion 174. The shoulder 176 may contact another suitable component of the spark plug assembly 100 to retain the piston 170 in position in the spark plug assembly 100. For example, in some embodiments as shown in FIGS. 4 and 5, an internal ridge 182 may be included in the monolithic hollow cylinder 110. The internal ridge 182 may extend into the interior 118 from the sidewall 116. In these embodiments, the shoulder 176 may contact the ridge 182 to retain the piston 170 in position in the spark plug assembly 100. In other embodiments as shown in FIG. 2, the shoulder 176 may contact a surface of the mounting flange 140 to retain the piston 170 in position in the spark plug assembly 100.

Piston 170 may additionally include suitable sealing apparatus (such as O-rings, etc.) to facilitate reduced air leakages and to improve thermal efficiency during operation. Such O-rings may be seated, for example, at a distal end of the first portion 172.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A spark plug assembly for use in a turbomachine, the spark plug assembly comprising:
   a monolithic hollow cylinder extending along a longitudinal axis between a first end and a second end, the monolithic hollow cylinder comprising a sidewall defining an interior, a first end wall defining a first end opening at the first end, and a second end opening at the second end,
   wherein a fin array extends from the sidewall of the monolithic hollow cylinder and comprises a plurality of fins, and
   wherein each fin in the plurality of fins is hexagonal;
   an igniter assembly extending along the longitudinal axis into the interior through the first end opening and from the interior through the second end opening;
   a mounting flange coupled to the monolithic hollow cylinder at the second end, the mounting flange including an internal thread for engaging an exterior thread of the monolithic hollow cylinder; and
   a piston surrounding the igniter assembly, the piston disposed within the interior and extending from the interior along the longitudinal axis through the second end opening and the mounting flange;
   wherein the piston includes a first portion defining a first maximum diameter, a second portion defining a second maximum diameter, and a shoulder defined between the first portion and the second portion, and
   wherein the shoulder contacts a surface of the mounting flange.

2. The spark plug assembly of claim 1, wherein the monolithic hollow cylinder further comprises a mount protrusion and a protruding portion extending from the sidewall, wherein the fin array extends from the protruding portion.

3. The spark plug assembly of claim 2, wherein the mount protrusion is hexagonal.

4. The spark plug assembly of claim 1, wherein the sidewall comprises the exterior thread at the second end.

5. The spark plug assembly of claim 1, wherein the monolithic hollow cylinder is formed from a metal.

6. The spark plug assembly of claim 1, wherein a diameter of the first end opening is less than a diameter of the second end opening.

7. The spark plug assembly of claim 1, wherein no tie-rods, nuts, or washers are utilized in the spark plug assembly.

8. The spark plug assembly of claim 1, wherein the mounting flange is configured to couple the spark plug assembly to the turbomachine.

9. The spark plug assembly of claim 1, wherein the mounting flange defines a plurality of fastening holes for receiving a plurality of fasteners.

10. The spark plug assembly of claim 1, wherein the mounting flange defines a central through-hole, the central through-hole defining the inner surface and including the internal thread.

11. A turbomachine, comprising:
    a compressor section;
    a combustor section;
    a turbine section; and
    a spark plug assembly connected with the combustor section, the spark plug assembly comprising:
    a monolithic hollow cylinder extending along a longitudinal axis between a first end and a second end, the monolithic hollow cylinder comprising a sidewall defining an interior, a first end wall defining a first end opening at the first end, and a second end opening at the second end,
    wherein a fin array extends from the sidewall of the monolithic hollow cylinder and comprises a plurality of fins, and
    wherein each fin in the plurality of fins is hexagonal;
    an igniter assembly extending along the longitudinal axis into the interior through the first end opening and from the interior through the second end opening;
    a mounting flange coupled to the monolithic hollow cylinder at the second end, the mounting flange including an internal thread for engaging an exterior thread of the monolithic hollow cylinder; and
    a piston surrounding the igniter assembly, the piston disposed within the interior and extending from the interior along the longitudinal axis through the second end opening and the mounting flange;
    wherein the piston includes a first portion defining a first maximum diameter, a second portion defining a second maximum diameter, and a shoulder defined between the first portion and the second portion, and
    wherein the shoulder contacts a surface of the mounting flange.

12. The turbomachine of claim 11, wherein the monolithic hollow cylinder further comprises a mount protrusion and a protruding portion extending from the sidewall, wherein the fin array extends from the protruding portion.

13. The turbomachine of claim 12, wherein the mount protrusion is hexagonal.

14. The turbomachine of claim 11, wherein the sidewall comprises the exterior thread at the second end.

15. The turbomachine of claim 11, wherein no tie-rods, nuts, or washers are utilized in the spark plug assembly.

* * * * *